Feb. 3, 1970             J. W. ALLEN             3,493,131
LIFT MECHANISM ARRANGEMENT FOR HINGED ROOF
Filed June 20, 1968            3 Sheets-Sheet 1
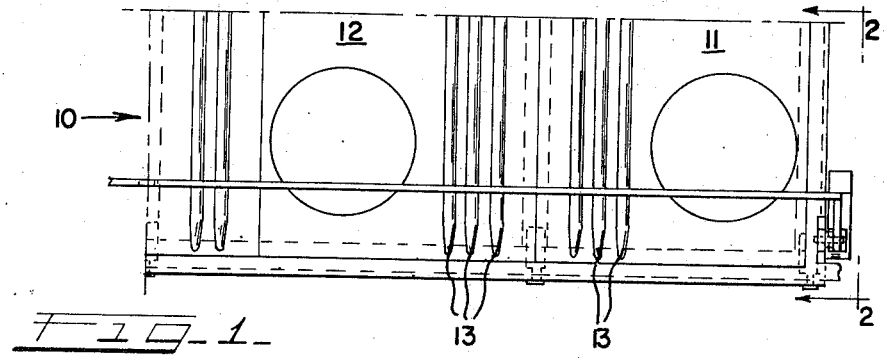
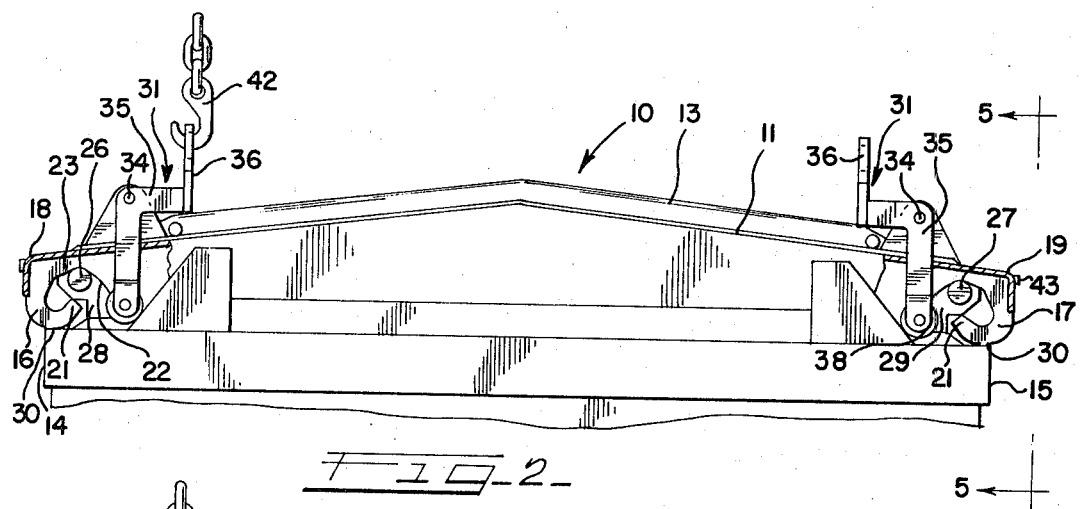
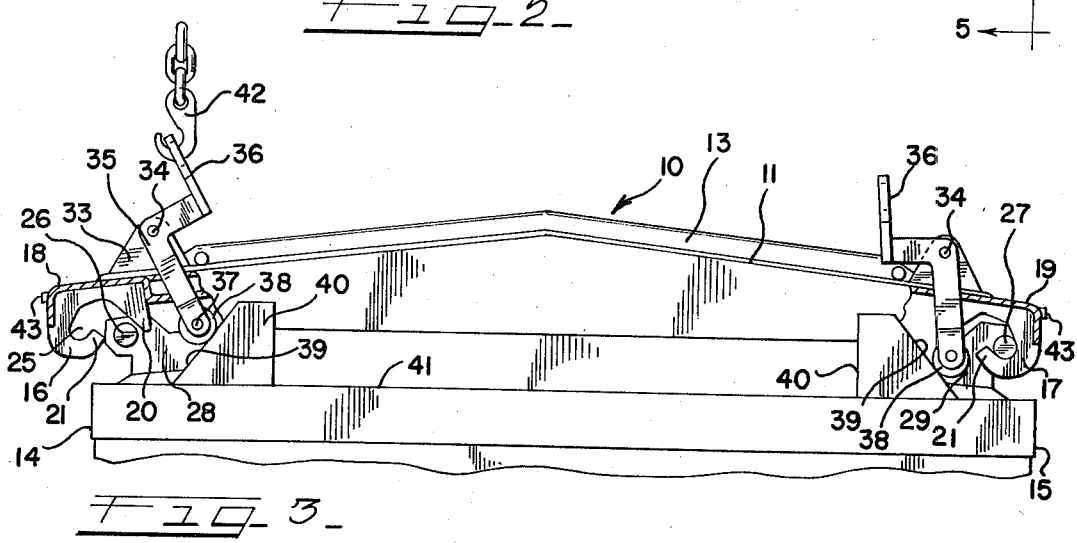
INVENTOR
JOHN W. ALLEN
BY
Sabin C. Bronson
ATT'Y.

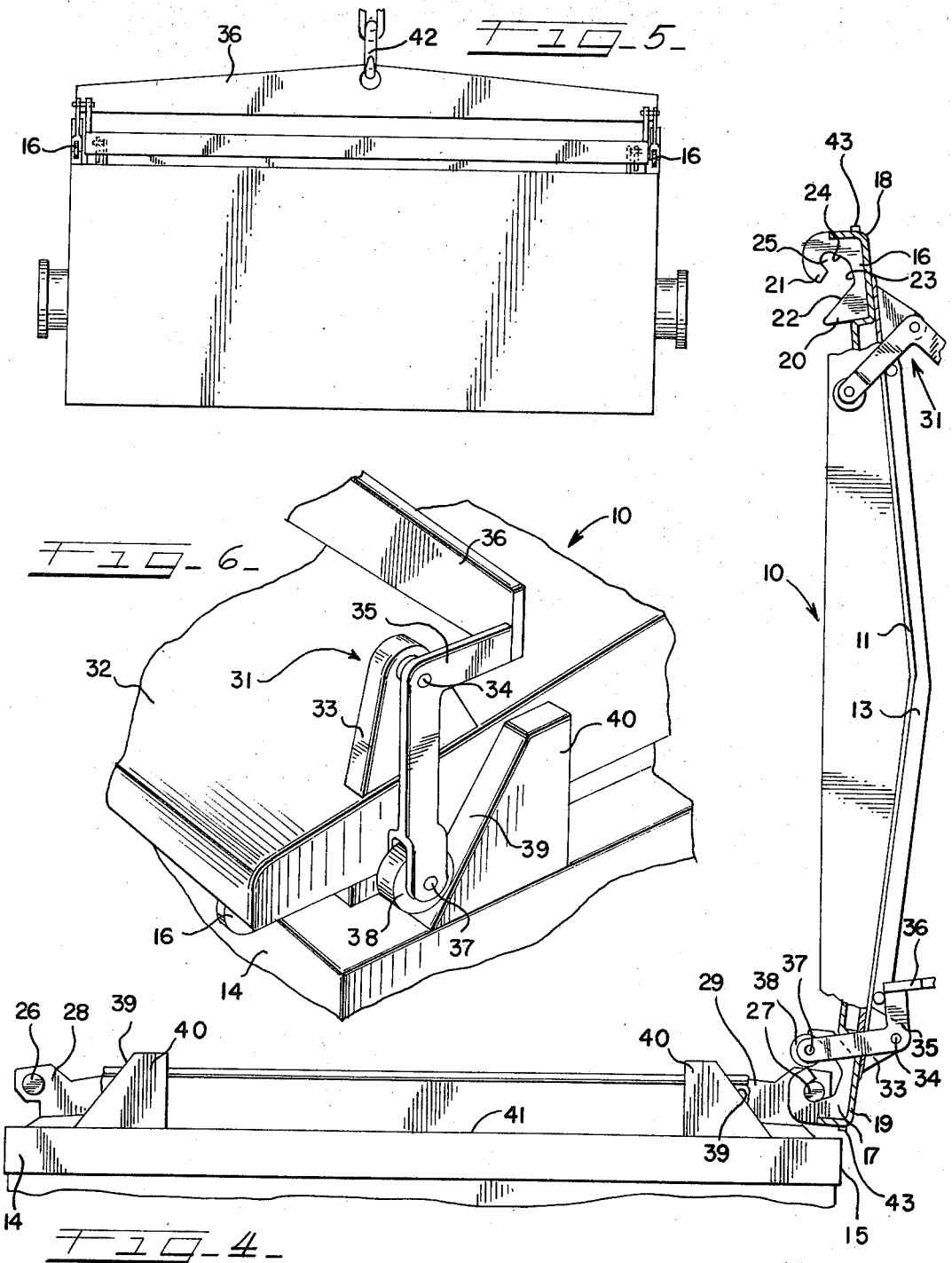

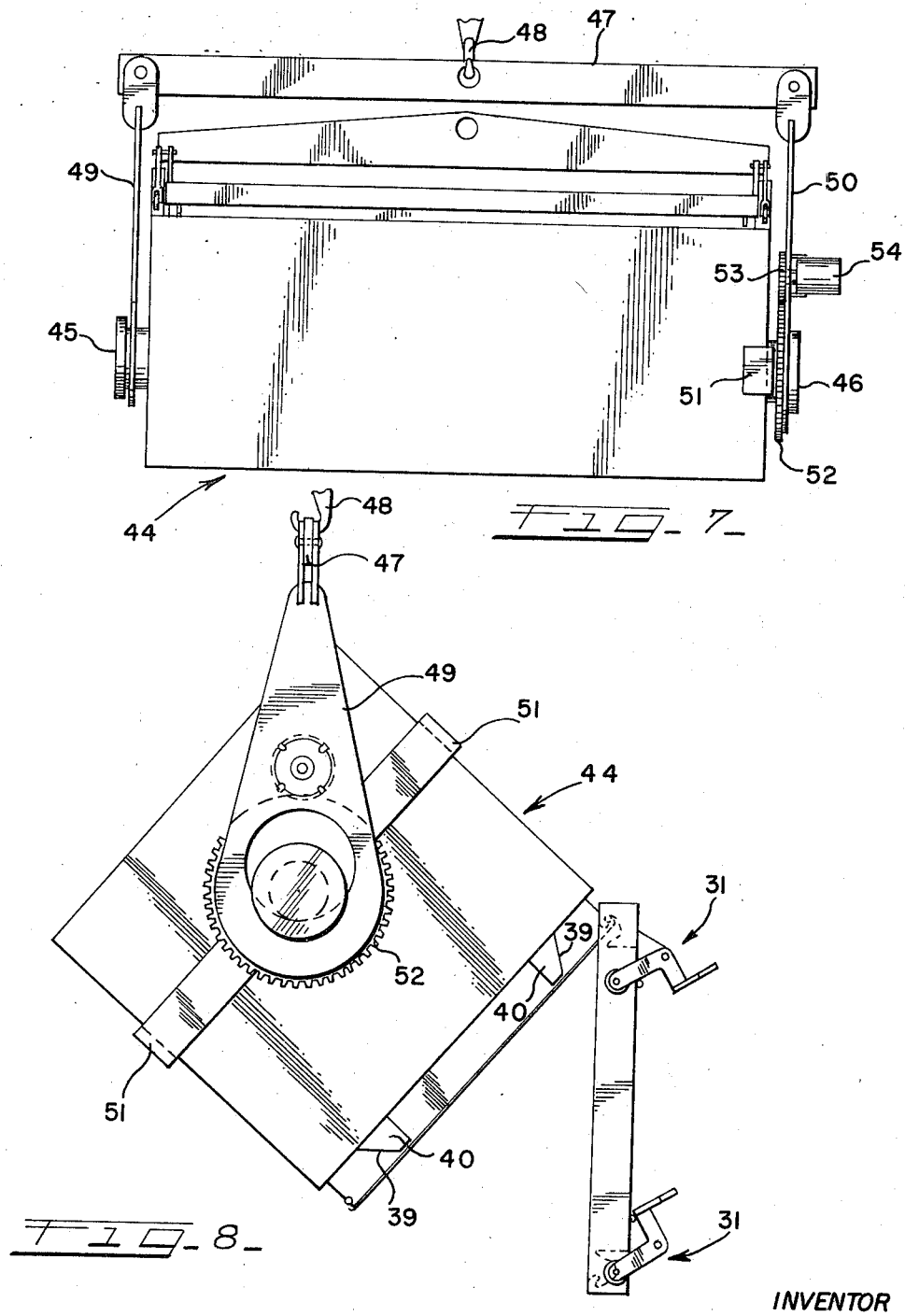

United States Patent Office 3,493,131
Patented Feb. 3, 1970

---

3,493,131
LIFT MECHANISM ARRANGEMENT FOR HINGED ROOF
John W. Allen, Flossmoor, Ill., assignor to Stanray Corporation, Chicago, Ill., a corporation of Delaware
Filed June 20, 1968, Ser. No. 738,652
Int. Cl. B61d 49/00, 39/00
U.S. Cl. 214—44                  5 Claims

ABSTRACT OF THE DISCLOSURE

A roof is hingedly and movably mounted on a railroad car by means of cooperating hooks on the roof and trunnion members on the tops of the car side walls. Associated with each hook and trunnion there is a lever pivotally mounted on the roof and carrying a roller which rides on an upwardly inclined surface on the top of the side wall. The levers at each side of the car are connected by a lifting beam to which lifting means, such as an overhead crane, can be attached at a central point thereof. As lifting force is applied at one side of the roof the lever mechanisms are turned and as the rollers on both sides of the car move upwardly on the inclined surfaces on the car the reaction is such that the hooks on that side where the force is being applied are unlatched from their trunnions and the hooks on the opposite side are urged into an embracing pivotal position with their associated trunnions. As the lifting force continues the roof is swung open from the car about these pivotal positions. The roof can be lowered by the lifting means in a reverse operation wherein the lever mechanisms are turned by the downward movement of the roof to positions where the roof is centered over the car and is in a latching engagement at both sides thereof.

---

Background—Summary—Drawings

In a co-pending application, Ser. No. 692,375, of which I am a joint inventor, a hinged roof for a railroad hopper or gondola car is shown. This roof is hinged along its opposite side edges so that it may move laterally by gravity to free the hinges along the lower edge when rotated in a rotary car dumper, and swing open for dumping the contents of the car through the roof.

In addition to the type of car dumping operation described above, there are of course other situations where it is desirable to provide a hingedly mounted roof for a railroad car. Thus, such an arrangement would be valuable when it is necessary to top load a car as, for example, by means of an overhead chute. Also, it is quite apparent that a car dumper is an expensive fixed installation and there are often occasions where it is desirable to dump lading from open top containers at a number of locations.

In order, therefore, to greatly extend the range of operations for a car or lading container with a hingedly mounted roof, I have provided means to facilitate loading the car or container whereby the roof can be opened and closed by lift means while the roof is securely retained on its associated car or container. I have also provided for power means which are adapted to rotate a container so that the roof will automatically open for emptying the car or container.

This invention provides a roof structure which is permanently attached to a railroad car or container but is also swingably mounted thereon so that the top of the car can be opened or closed as desired. My invention is not restricted to a roof structure for a railroad car as it is adaptable to any open top car or container. However, for the purpose of this disclosure I have chosen to show its application to a railroad car and also to an open top container which can be carried on a railroad car.

The mounting or hinge means for the swingable roof of my invention includes downwardly opening hook members at the side edges of the roof and these hook members are adapted to cooperate with associated trunnions on the top side edges of the container. The hooks are so shaped that when the roof is disposed in a horizontal position on the car the hooks rest on the trunnions in such a manner that the roof covers the car top opening and also rests securely thereon. At each side of the car there are pivotally mounted lever means carried by the roof and having rollers which are adapted to coact with inclined surfaces on the car. The levers at each side edge of the car are operatively connected by a lifting beam having means at its center point for receiving a hook of a lifting means such as a crane. The pivoting axis of the levers on each side of the car are parallel to the axis of the trunnions associated with the hooks.

If it is desired to open the roof from the car, a lifting force is applied to one lifting beam while no lifting force is exerted on the beam at the other side edge. As the beam is lifted the levers at that side of the car are turned about heir pivot points and the rollers ride upwardly along inclined surfaces on the car. To a lesser degree the rollers on the levers at the opposite side of the roof are being urged upwardly on the associated inclined surfaces on the car. This produces a lateral and upward movement of the roof which results in the hooks being unlatched from their trunnions at the side of the roof where the lifting force is being applied and at the same time the hooks at the opposite side edge are being urged into a pivotal engagement with the associated trunnions on the car. Thus, as the lifting force continues, the unlatched side of the roof is swung upward about the pivot points on the opposite side of the car to open up the top of the car or container.

The top opening of the car can be reclosed by the roof in a reverse operation to that involved in opening the top of the car. Thus, as the lifting force is gradually released, the unlatched side of the roof is lowered until the lever rollers contact and continue downward travel along the inclined surfaces on the container or car. Such action, together with the movement of the levers and rollers at the opposite side of the roof, causes a reverse lateral shift of the roof to its horizontal car covering position.

It is apparent from the above description of the mode of operation of the hinged roof that an outside force is required to lift and swing the roof about the car or container. A preferred way of applying such outside force is through the use of lifting means such as a crane and hook. However, my invention is not confined to this type of force application, and I also provide for a power attachment means that can be carried on a container to rotate the container from an upright position to a tilted position and to return the conainer o its upright position through a reverse movement. As these movements take place, the roof unlatching, opening and recovering operation is the same as that described above except that the force of gravity moves the roof sideways to unlatch the lower side from the trunnions.

The present invention will be more fully and readily understood by reference to the accompanying drawings taken in conjunction with the following specification wherein like reference characteristics refer to like parts.

FIGURE 1 is a top plan view of a portion of a roof structure with a portion of the lifting mechanism attached thereto.

FIGURE 2 is an end view of a container showing a crane hook attached to one of the lifting beams but with the roof in a horizontal or rest position covering the top of the car.

FIGURE 3 is a view similar to FIGURE 2 showing the lift elements at the left side of the car as slightly elevated to release or unlatch the associated hinge so that this side of the roof can be raised and pivoted on the hinges on the opposite side of the car.

FIGURE 4 is a view similar to FIGURE 3 but showing the roof as completely swung open.

FIGURE 5 is a side view of a car showing the lifting means.

FIGURE 6 is a perspective view of the lift mechanism at one end of the lifting beam.

FIGURE 7 is a view of a container carrying a roof arrangement similar to that shown in FIGURES 1 to 6, inclusive, but having a portable lifting and rotating yoke.

FIGURE 8 is a side view of FIGURE 7 with the container elevated and rotated so that the roof is swung to an open container dumping position.

Description of the preferred embodiments

In the drawing, 10 indicates generally a railroad car roof and a corner portion of this roof is shown in FIGURE 1. It will be understood that the rest of the roof is symmetrical about this portion and is formed integrally therewith. There are two roof sheets 11 and 12 and adjacent their meeting edges these sheets are provided with a plurality of parallel corrugations 13 that are pressed upwardly from the plane of the sheet and which extend across the roof.

As seen in FIGURE 2, the roof 10 is supported along the side edges thereof on the upper margins of the car side walls 14 and 15. Hooks 16 and 17 are secured by suitable means, such as welding, to the side edges 18 and 19, respectively, of the roof 10 at the ends thereof as seen in FIGURE 5. The hooks on both sides of the roof are identical so that a description of a single hook 16 will suffice. This hook 16 is formed from a metal block and has a nose portion 20 with a spaced tip portion 21 so as to provide an opening into the interior of the hook. The interior walls of the hook 16 include sloping walls 22 and 23 which converge and a wall 24 running from wall 23 toward the tip 21 to provide a recess 25. This hook configuration can best be seen in FIGURE 4 where the roof is shown in open position on the container.

In the closed position of the roof 10, as shown in FIGURE 2, the converging interior walls 22 and 23 of hook 16 and a similar type hook 17 bear on trunnions or pins 26 and 27 projecting from lugs 28 and 29 carried on the top of the side walls 14 and 15, respectively. This trunnion and lug construction is best seen in FIGURE 4.

At each of the hook and trunnion locations there is a roof lifting arrangement which is generally indicated at 31 and is best seen in FIGURE 6. Here again each of these lifting arrangements is the same so that a description of one will suffice. The top wall surface 32 of the roof 10 has a lug 33 suitably secured thereto and this lug has a pin 34 extending therefrom. Pivotally supported on this pin 34 there is an L-shaped lever 35, one end of which is secured to an end of a lifting beam 36 and the other end of which is bifurcated with a pin 37 therethrough on which is rotatably carried a roller 38. This roller 38 is adapted to roll on the upwardly and inwardly inclined surface 39 on a lug 40 secured to the top surface 41 of the car side wall 14.

The lifting beam 36 has an opening centrally disposed to receive a chain hook 42 from a lifting means not shown. As it is desired to raise the roof 10 off the car, power can be applied to the lifting arrangement, through the hook 42, lifting beam 36, to both roof lifting arrangements 31 at one side of the car, as for example the left side of the car as seen in FIGURES 2, 3 and 4 of the drawings. Referring to FIGURE 3, it can be observed that as the lifting force is applied, lever 35 rotates about pin 34 and roller 38 rolls up the incline 39 on lug 40. This causes hook 16 to be lifted off pin 26 and the pin is allowed to slip between the nose portion 20 and tip 21 of the hook 16 so as to unlatch the hook on that side of the car. Simultaneously the lifting arrangements 31 on the opposite side of the car have been moved slightly upward on the inclined surfaces 39 of the associated lugs 40 so that pins 27 slip into the recesses 25 of their associated hooks. In summary, then, the lifting force acting through the lifting arrangements has laterally and upwardly displaced the roof 10 from a rest position as seen in FIGURE 2 to an unlatched and pivotal position as seen in FIGURE 3.

As the lifting force is continued the unlatched side of the roof 10 is moved upward and to the right about the pivot point of the pins 27 on the right-hand side of the car to a fully opened position as seen in FIGURE 4. Stop blocks 43 on opposite sides of the roof are positioned to contact the car side walls and limit the turning movement of the roof. In this connection it should be obvious that as a lifting force is applied to the lifting arrangement 31 on the right-hand side of the car that the roof will be opened toward the left-hand side of the car.

When it is desired to close the roof over the car opening the lifting force can be gradually released. As the rollers 38 of the lifting arrangement 31 again contact their associated inclined surfaces 39 on lugs 40, the hooks 16 and 17 will be laterally displaced toward the right-hand side of the car and the roof will settle to its rest position as shown in FIGURE 2.

The above embodiment shows a lifting means along both edges of the roof so that the roof can be opened in either direction. Only one such lifting mechanism is required if the roof is always opened in the same direction.

The arrangement heretofore described provides a convenient means for opening and closing a roof portion of a car or lading container which would normally be positioned in an upright position. The car may be of the hopper or gondola type and the containers may be carried by various means on railroad cars. However, it is possible that in certain situations it might be necessary not only to open and close the roof of a container but also tilt the container for purposes of dumping the lading. Such an arrangement is shown in FIGURES 7 and 8 of the drawings and will now be described.

In FIGURES 7 and 8 a container is generally indicated at 44 and has trunnions 45 and 46 mounted thereon. A lifting and rotating yoke arrangement includes a top bar 47 with a central opening to receive a hook 48 of a lifting means. Yoke arms 49 and 50 extend downward from top bar 47 and have openings therein to fit over the trunnions 45 and 46, respectively. Rotating arms 51 are secured to a gear 52 that is associated with a driving gear 53 that is turned by an electric or air motor 54 fixed to the yoke arm 50.

It will be noted that a roof lifting arrangement similar to that previously described, is shown on the container 44. If necessary, lifting means can be used with this arrangement, or the container can be turned or rotated by the power means. For example, as the motor 54 is energized the container 44 will be tilted from an upright position to a pour position as seen in FIGURE 8, and by action of gravity the roof will move sideways to unlocked position and open with continued rotation.

Although the embodiments constructed in accordance with the present invention have been described with the requisite particularity, the disclosure is of course exemplary. The foregoing disclosure, taken in connection with the accompanying drawings, it is believed will enable one versed in this art to comprehend, make and use the invention.

I claim:

1. A lifting arrangement for a roof on a car including in combination, a plurality of downwardly opening hook members disposed in space relationship along opposite side edges of said roof, associated trunnion means on the tops of the car side walls, said hooks being so shaped that when the roof is in a car covering position a rounded portion of each hook embraces its associated trunnion to retain said roof in said covering position, lever mechanisms pivotally mounted on axis parallel to the axis of adjacent trunnions, a lifting beam connecting the mechanism at each side edge of the car, each mechanism having a roller member designed to engage an upwardly inclined surface on the top of the car side wall, said mechanisms and associated inclined surfaces being so constructed that as an upward lifting force is applied to a lifting beam at one side of the car the reaction of the rotating movement of the lever on the inclined surfaces on the car unlatches the hooks from the trunnions at the force application side while the hooks at the opposite side of the car are forced laterally into a pivotal embracing position on their associated trunnions, whereby further lifting force on the roof causes the roof to swing open about the pivot positions at the one care side wall.

2. The lifting arrangement as in claim 1 wherein the downward movement of the rollers on the associated inclined surfaces as the roof is lowered from an open position to a closed position on the roof is such that the roof is laterally urged to the position where the rounded portions of each hook embrace its associated trunnion as the roof reaches its horizontal car covering position.

3. The lifting arrangement as in claim 1 wherein the rounded portion of each hook is opposite the hook opening and wherein a curved recess adjacent the hook opening is designed to receive an associated trunnion in said pivotal embracing position.

4. A swingable roof arrangement for a container including a plurality of downwardly opening hook members spaced along opposite side edges of said roof, trunnion members on the tops of said container side walls, levers pivotally mounted in spaced relationships along at least one of said side edges, each lever having a roller designed to roll on associated upwardly inclined surfaces on said container, said hooks each having a round portion to embrace its associated trunnion when the roof is in closed position on the container, each of said hooks also having a curved recess which is designed to pivotally embrace an associated trunnion when the roof is laterally shifted relative to the container, an opening in each of said hooks adjacent said curved recess, said roof being laterally shifted when a lifting force is applied to the levers on one side edge of the roof, such shifting movement causing the hook openings in the hooks on the forced application side to slip over their associated trunnions to thereby unlock that side of the roof from the container, this shifting movement also causing the curved recesses in the hooks on the opposite side of the roof to embrace their associated trunnions in a pivotal relationship thereto, whereby as said lifting force is continued the roof is swung open around said opposite side of said container.

5. The combination with a removable roof, for a container or open top railroad car, having a series of hooks spaced along two opposite edges of said roof, said hooks along one edge facing in one direction and the hooks along the other edge facing in the opposite direction, a series of spaced trunnions mounted along the upper edges of the side walls of said container or car, for cooperative association with said hooks, said hooks being so shaped that when the roof is in covering position, the hooks embrace the associated trunnions to retain the roof in said covering position, of a lifting beam along a side edge of said container or car, lever mechanisms extending from the ends of said beam, pivotally mounted intermediate its ends to said roof, wedge means, having an upwardly inclined surface mounted on said car, said mechanisms and associated inclined surfaces being so constructed that an upward lifting force applied to said beam will force the roof laterally so that the hooks are disengaged from the trunnions and the roof can be opened by further lifting force on said beam.

References Cited
UNITED STATES PATENTS 1,428,448  9/1922  Peck _____ 214—44 XR ROBERT G. SHERIDAN, Primary Examiner U.S. Cl. X.R.

105—377